March 9, 1965 L. R. BEARD 3,172,686
COUPLER
Filed May 28, 1963 2 Sheets-Sheet 1
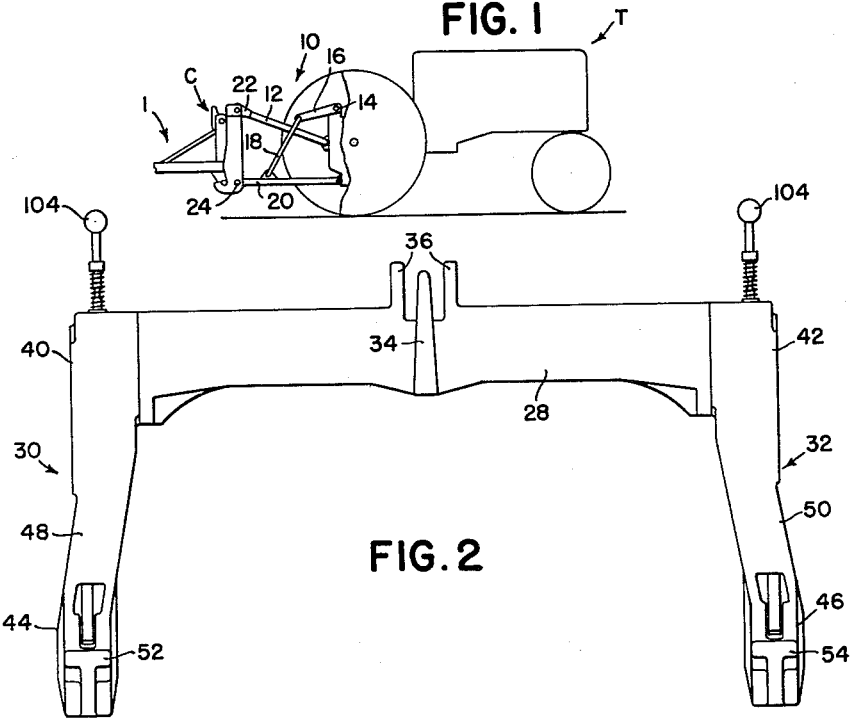
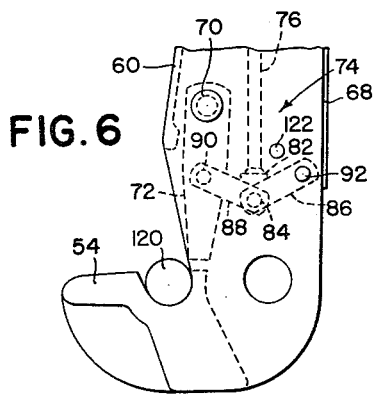
FIG. 6
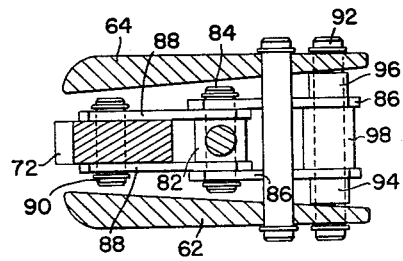
FIG. 5
INVENTOR.
LAWRENCE R. BEARD
BY
ATTORNEY March 9, 1965 L. R. BEARD 3,172,686
COUPLER Filed May 28, 1963 2 Sheets-Sheet 2

INVENTOR.
LAWRENCE R. BEARD
BY
*John C. Thompson*
ATTORNEY

United States Patent Office 3,172,686
Patented Mar. 9, 1965

3,172,686
COUPLER
Lawrence R. Beard, Waterloo, Iowa, assignor to Deere & Company, Moline, Ill., a corporation of Delaware
Filed May 28, 1963, Ser. No. 283,832
3 Claims. (Cl. 280—461)

The present invention relates generally to agricultural implements and more particularly to means for coupling implements to tractors having a power operated three-point hitch, in which the tractor carries upper and lower vertically and laterally swingable hitch links, the rear ends of which are adapted to be connected with any one of a number of different available implements, and in which power means is provided for raising and lowering the links to raise and lower the implement associated therewith.

The object and general nature of this invention is the provision, in a coupler frame especially constructed and arranged to be connected to the rear ends of the upper and lower hitch links of a tractor and provided with hook means engageable with upper and lower hitch pins carried by a companion frame normally forming part of an implement, of improved latch means to hold the lower implement hitch pins within the lower hook means of the coupler.

More specifically, it is a feature of this invention to provide a latching mechanism which is controllable by the operator in which, when the latch is in its latching position, the linkage which controls the latch is in an overcenter position.

These and other objects and advantages of the invention will be apparent to those skilled in the art after a consideration of the following detailed description, taken in conjunction with the accompanying drawings, in which:

FIG. 1 is a side view, diagrammatic in nature, illustrating a farm tractor having the coupler of this invention mounted thereon, and an implement secured to the coupler.

FIG. 2 is a rear view of a coupler in which the improved latch of this invention has been incorporated.

FIG. 5 is a detail view taken along the line 5—5 in FIG. 4.

FIG. 6 is a fragmentary end view showing the latching means in its disengaged position.

Figure 3:
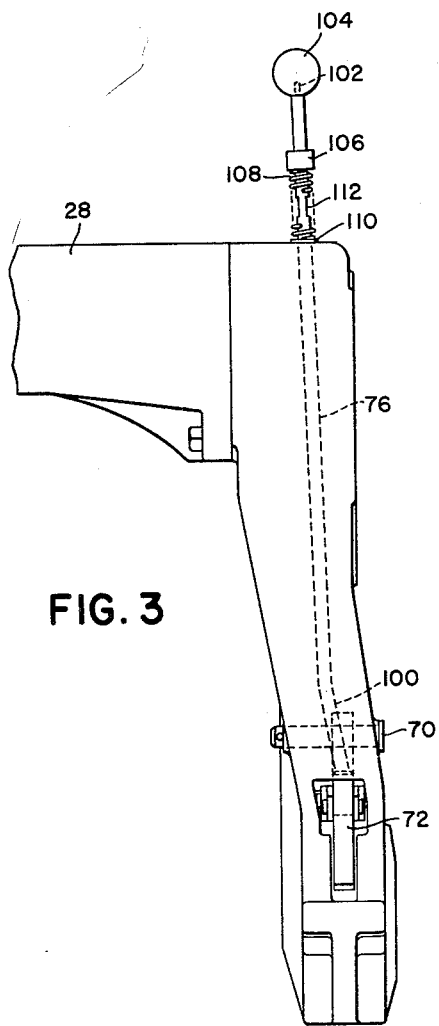
FIG. 3 is an enlarged rear view of an end portion of the coupler showing the latching means in greater detail.

Referring first to FIG. 1, the tractor T with which this invention is particularly adapted to cooperate is of the usual construction and includes a power lift mechanism 10 carried at the rear portion of the tractor and having an upper hitch link 12 and a rockshaft 14 carrying a pair of lift arms 16 which are connected through lift links 18 to raise and lower a pair of lower hitch links 20, which constitute the principal portions of the conventional three-point hitch linkage with which many tractors today are equipped. The links 12 and 20 are connected at their forward ends with the rear portions of the tractor T for both vertical and horizontal movement, and the rear ends of the links 12 and 20 are provided with implement-connecting sections 22 and 24, respectively, that are apertured or otherwise formed to receive the hitch pins carried by those implements that are adapted to be connected with the tractor T.

The implement coupler of this invention, indicated in its entirety by C in FIG. 1, is adapted to be secured to the implement-connecting sections 22 and 24. The coupler is provided with upper and lower hooks which are adapted to receive the upper and lower hitch pins that are carried by the implement I.

By employing a coupler it is possible for the operator of the tractor to secure an implement to the tractor merely by engaging the hitch pins of the implement with the hooks of the coupler. This procedure is well known in the art and is more fully described in the patents to Hess, 2,979,137, Hess et al., 3,048,228 and Virtue et al., 3,065,977.

The implement coupler of this invention comprises a transverse bight 28 and two depending legs 30, 32. The transverse bight 28 is provided with a centrally disposed hook 34 which is adapted to receive the upper hitch pin of the implement. The bight is also provided with two upstanding lugs 36 which receive the implement connecting section 22 of the upper hitch link 12, the lugs being apertured to receive a pin which may be passed through the apertures and the connecting section 22 to secure the upper hitch link to the top surface of the bight 28.

The legs 30, 32 have upper portions 40, 42 which are secured to the ends of the bight 28, lower offset portions 44, 46, and intermediate connecting portions 48, 50 respectively. The lower portions 44, 46 are provided with rearwardly disposed hooks 52, 54, respectively, which are adapted to receive the lower hitch pins of the implement.

Each of the legs 30, 32 is generally channel shaped and has a rear side wall 60, and right and left side walls 62 and 64 respectively. A top apertured portion 66 and a front cover plate 68 enclose the upper portion of each leg. Disposed in aligned apertures in the side walls 62, 64, is a pivot pin 70 which carries a swingable latching bar 72. The latching bar 72 can be swung from a lower implement hitch pin engaging position illustrated in FIG. 4 to a disengaged position illustrated in FIG. 6 by the overcenter or toggle linkage mechanism illustrated generally at 74.

The linkage mechanism 74 includes a generally vertically extending latch rod 76 which projects through a keyhole shaped aperture 78 in a cover plate 80 that is secured in any conventional manner to the top portion 66. The lower end of the latch rod 76 is rigidly secured to a transversely apertured block 82 through which a pivot pin 84 is disposed. Disposed between each side of the block and the retaining rings (no number) at the ends of the pin are forwardly and rearwardly extending links 86, 88 respectively. The rearward end of the links 88 are disposed to either side of the latch bar 72 and about a transverse pin 90 which is disposed within an aperture intermediate the ends of the latch bar. The front ends of links 86 are apertured and disposed about a transversely extending pin 92 which is carried by the side walls 62, 64. Spacers 94, 96, 98 hold the front ends of the links 86 in alignment with the rear ends of the links.

The latch rod 76 is offset at its lower end to the right at 100 in the right-hand leg (as can be seen from FIG. 3), and is similarly offset to the left in the left-hand leg.

The upper end of the latch rod 78 carries a reduced portion 102 on which a ball or knob 104 is fixed. Below the knob 104, the rod 76 is formed to fixedly receive an abutment sleeve 106 against which the upper end of spring 108 bears. The lower end of the spring 108 bears against a washer 110 that overlies the keyhole slot 78. The latch rod 76 is shaped to form a narrowed portion 112 that is adapted to be slipped into the narrowed portion 114 of the slot 78 when the latch rod is depressed against the spring 108 to move the latch bar 72 forwardly as shown in FIG. 6.

Figure 4:
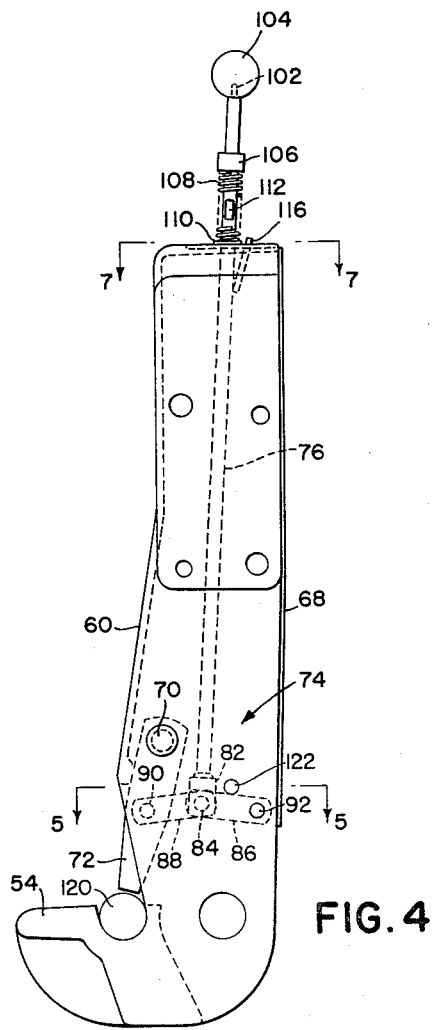
FIG. 4 is an end view of the coupler shown in FIG. 3, the latching means being shown in its latching or engaging position.
Figure 7:
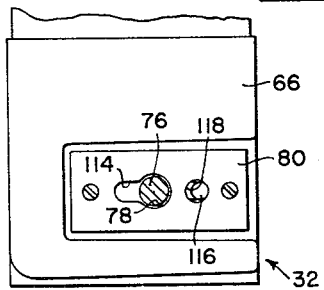
FIG. 7 is a top view of the right-hand leg taken along the lines 7—7 in FIG. 4.

An indicator 116 is secured to latch rod 76 by welding and is so located as to afford the operator an indication that each latch bar 72 is in its proper position. Thus, when the latch bar 72 is disposed to the rear, as shown in FIG. 4, the latch rod will be in its upper position and the indicator will project through hole 118 in cover plate 80. Similarly, when the latch bar 72 is disposed forwardly, as shown in FIG. 6, the latch rod 76 will be in its lower position and the indicator will not project through the hole and thus will not be visible to the operator.

In operation, to receive an implement the coupler latch bar 72 must be positioned in its forward or inoperative position illustrated in FIG. 6. If the coupler initially has the latch bar 72 in its rearward or operative position, illustrated in FIG. 4, it is only necessary to depress the ball 104 and to dispose the narrowed portion 112 of the rod 76 within the narrowed portion 114 of the keyhole slot 78. In this position of the rod the latch bar 72 will assume the position illustrated in FIG. 6. After the implement hitch pins 120 are engaged by the hooks 34, 52, 54, it is only necessary to slide the rod 76 forwardly until the narrowed portion of the rod is no longer in engagement with the narrowed portion 114 of the slot, in which position the rod 76 and pivot pin 84 will be caused to be moved upwardly by the action of the spring 108 until it assumes the position illustrated in FIG. 4. In this position the latch bar will be disposed to the rear and effectively lock the lower implement hitch pins within the hooks 52, 54.

By employing the overcenter linkage 86, 88, undesirable forward movement of the latch bar can be restricted. Thus if the latch bar tends to move forwardly when the rod 76 is in its raised position, forward movement will be restricted by the pin 122 which will be engaged by the link 86, which, when the linkage is in its overcenter position, would tend to move upwardly as the latch bar 72 is moved forwardly. Appreciable forward movement of the latch bar 72 can only be accomplished by moving the pin 84 from its overcenter position, shown in FIG. 4, past the center position, which is defined by the plane passing through the axes of pins 90 and 92, to the position illustrated in FIG. 6, in which continued movement of the links 86 and 88 away from the center position is not restricted, thus permitting the latch bar 72 to move to its fully inoperative position.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

I claim:
1. An implement coupler adapted to connect a tractor having upper and lower hitch links and power lift means connected to raise and lower said links with an implement having upper connection means and generally transversely extending lower hitch pins; the implement coupler comprising: a transverse bight, a pair of depending legs having oppositely disposed side walls, upper and lower means adapted to receive the rear ends of said upper and lower hitch links fixed to the bight and legs respectively, means fixed to the bight to receive the upper connection means, hook means on said legs adapted to receive the lower hitch pins, and latching means carried by each of said legs and adapted to cooperate with the lower hook means to hold the lower hitch pins within the lower hooks, each of said latching means comprising a latch bar swingable between an operative position and an inoperative position, said latch bar being pivotally mounted at its upper end to its associated leg, an over-center linkage having a pair of link means pivotally secured to opposite sides of an intermediate pivot means, means pivotally interconnecting one end of the overcenter linkage with an intermediate portion of said latch bar, means pivotally interconnecting the other end of said overcenter linkage with said leg, a rod member connected at its lower portion to said intermediate pivot means and extending upwardly between said oppositely disposed side walls of said leg portion, and means on the upper portion of said coupler frame adapted to engage the upper portion of each rod member for holding the latter and the associated latch bar in a selected position.

2. An implement coupler adapted to connect a tractor having upper and lower hitch links and power lift means connected to raise and lower said links with an implement having upper connection means and generally transversely extending lower hitch pins; the implement coupler comprising: a transverse bight, a pair of depending legs having oppositely disposed side walls, upper and lower means adapted to receive the rear ends of said upper and lower hitch links fixed to said bight and legs respectively, means fixed to the bight to receive the upper connection means, hook means on said legs adapted to receive the lower hitch pins, and latching means carried by each of said legs and adapted to cooperate with the lower hook means to hold the lower hitch pins within the lower hooks, each of said latching means comprising a transversely extending pivot pin extending between the opposite side walls of each leg, a depending swingable latch bar secured at its upper end to said pivot pin, an overcenter linkage comprising an intermediate pivot means, first link means pivotally interconnected with an intermediate portion of the latch bar at one end and pivotally interconnected with the intermediate pivot means at the other end, and second link means pivotally interconnected with the oppositely disposed side walls of said leg at one end and pivotally interconnected with the intermediate pivot means at the other end, means mounted on said leg and engageable with said second link means to restrict movement of said second link means in one direction, said restricting means being so positioned with respect to said second link that when the link is in contact with the restricting means the linkage is in its overcenter position and said latch bar is in its operative position, means engageable with said linkage means to normally bias the linkage into its overcenter position, and means operatively associated with said last-mentioned means to hold said linkage means in a second position in which said latch bar is in its inoperative position.

3. The invention set forth in claim 2 in which the linkage biasing means comprises a rod member connected at its lower end to said intermediate pivot means and extending upwardly between said oppositely disposed side walls of said leg portion, abutment means on said rod disposed above the upper end of said leg, abutment means mounted on said leg, and compression spring means disposed between said abutment means.

References Cited by the Examiner
UNITED STATES PATENTS

| 967,713 | 8/10 | Blom | 280—508 |
| 3,048,228 | 8/62 | Hess et al. | 172—272 |

A. HARRY LEVY, *Primary Examiner.*

LEO FRIAGLIA, *Examiner.*